United States Patent
Dyck et al.

(10) Patent No.: US 10,011,307 B2
(45) Date of Patent: Jul. 3, 2018

(54) MODULAR FENDER ASSEMBLY

(71) Applicant: Shift Products Ltd., Winnipeg (CA)

(72) Inventors: David Dyck, Winnipeg (CA); William Stanton, Winnipeg (CA)

(73) Assignee: Shift Products Ltd., Winnipeg (CA)

(*) Notice: Subject to any disclaimer, the term of this patent is extended or adjusted under 35 U.S.C. 154(b) by 114 days.

(21) Appl. No.: 15/071,577

(22) Filed: Mar. 16, 2016

(65) Prior Publication Data
US 2016/0280281 A1    Sep. 29, 2016

Related U.S. Application Data

(60) Provisional application No. 62/138,536, filed on Mar. 26, 2015.

(51) Int. Cl.
*B62D 25/18* (2006.01)
*B62D 25/16* (2006.01)

(52) U.S. Cl.
CPC ........... *B62D 25/18* (2013.01); *B62D 25/168* (2013.01)

(58) Field of Classification Search
CPC .............................. B62D 25/18; B62D 25/168
USPC ................................. 296/198; 293/102, 124
See application file for complete search history.

(56) References Cited

U.S. PATENT DOCUMENTS

| | | | | |
|---|---|---|---|---|
| 3,876,229 A * | 4/1975 | Kohn | ................... | B62D 25/168 280/847 |
| 3,922,003 A * | 11/1975 | Lea | ...................... | B62D 25/168 280/851 |
| 4,268,053 A * | 5/1981 | Toppins | ............... | B62D 25/168 280/154 |
| D340,214 S * | 10/1993 | Lawrence | .................... | D12/184 |
| D342,928 S * | 1/1994 | Lawrence | .................... | D12/184 |
| 7,222,884 B2 * | 5/2007 | Callan | .................. | B62D 25/182 280/154 |
| 9,162,709 B2 * | 10/2015 | Gray | ...................... | B62D 25/18 |
| 2007/0057536 A1 * | 3/2007 | Longchamp | ......... | B62D 25/168 296/198 |
| 2007/0187941 A1 * | 8/2007 | Eklund | ................ | B62D 25/166 280/848 |
| 2009/0302645 A1 * | 12/2009 | Egging | ................ | B62D 27/023 296/198 |

* cited by examiner

*Primary Examiner* — Jason S Morrow
*Assistant Examiner* — E Turner Hicks
(74) *Attorney, Agent, or Firm* — Ryan W. Dupuis; Ade + Company Inc.; Kyle R. Satterthwaite

(57) ABSTRACT

A modular fender assembly for a vehicle includes a fender body having first and second body portions defining respective portions of the exterior of the fender body. First and second joiner brackets are bonded onto inner ends of the first and second body portions respectively. The joiner brackets have joiner flanges which can be joined with one another in parallel abutment to join the first and second body portions. Either body portion of the fender can thus be trimmed to length to suit the application prior to bonding the joiner bracket in position according to the new trimmed length. The joiner brackets typically have multiple overlapping and interlocking joiner flanges which span across the abutted seam between the two adjacent fender body portions, including upright stiffener flanges, for improving strength to reduce bending and sagging of the fender assembly at the seam.

17 Claims, 8 Drawing Sheets

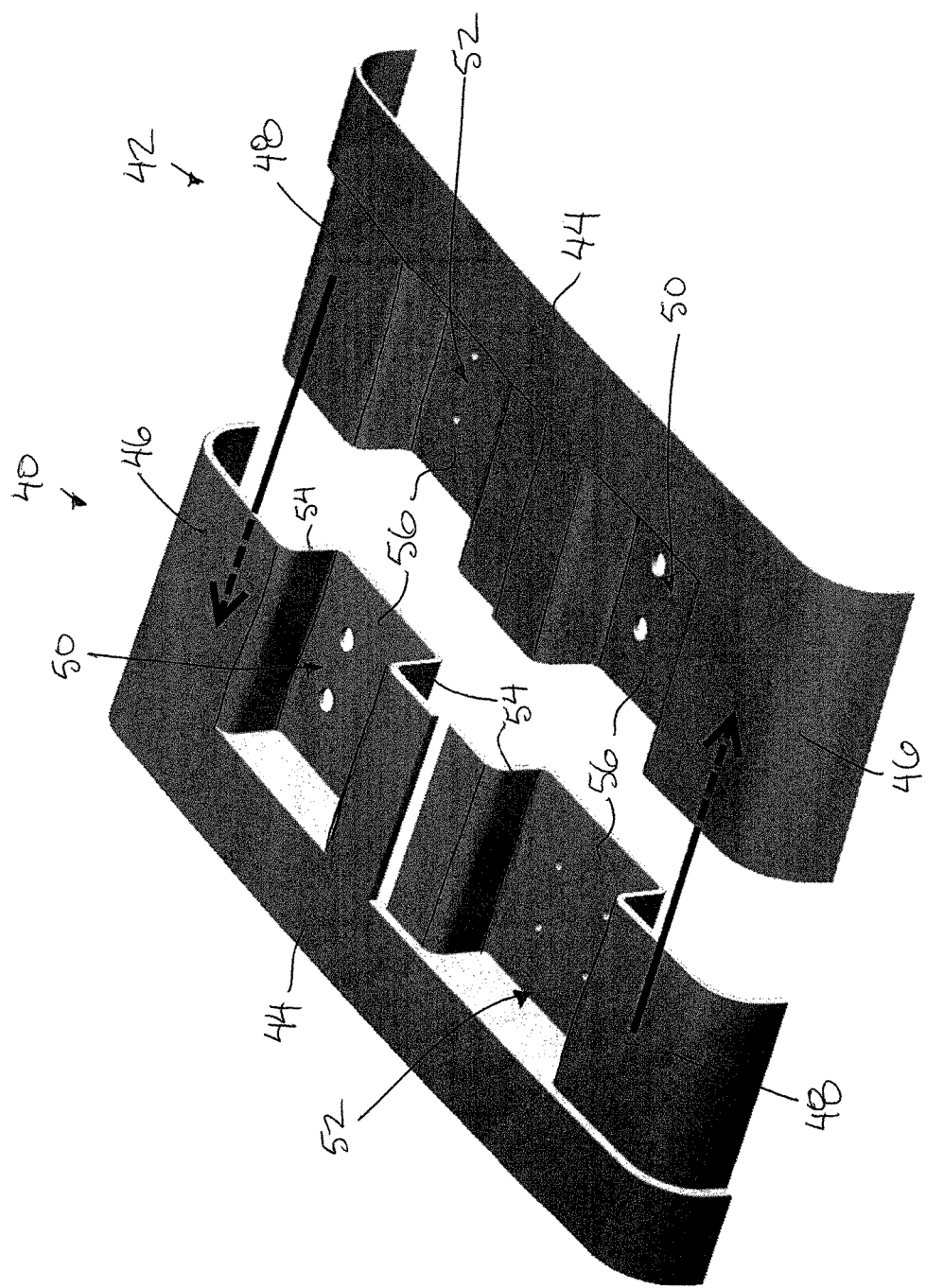

MODULAR FENDER ASSEMBLY

This application claims the benefit under 35 U.S.C. 119(e) of U.S. provisional application Ser. No. 62/138,536, filed Mar. 26, 2015.

FIELD OF THE INVENTION

The present invention relates to a modular fender assembly comprising a plurality of fender body portions joined to one another by respective joiner brackets on the fender body portions respectively to form an assembled fender body, and more particularly the present invention relates to a modular fender assembly in which at least one of the joiner brackets can be secured to the respective fender body portion by bonding at a selected one of a plurality of longitudinal positions thereon such that the fender body portion can optionally be trimmed to adjust the length thereof prior to joining of the respective joiner bracket to the fender body portion and joining of the fender body portions to one another.

BACKGROUND

Fenders are commonly provided on various types of vehicles for managing and containing water and debris sprayed or thrown upwardly from the rotating wheels of the vehicle. In the instance of a highway truck tractor, the front wheel fenders are typically incorporated into the body panels of the cab, however the rear wheels at the rear of the vehicle are either exposed, or only partially enclosed by external fenders. The rear portion of the frame of the highway truck tractor, which is located between the rear wheels, supports a fifth wheel hitch thereon for connection to a trailer. Fender mounting arms protrude laterally outwardly from opposing sides of the rear portion of the frame to support the rear fenders suspended above the rear wheels.

The choice of fenders typically include: i) a single fender, or single axle double radius fender, in which a single curved panel extends about a respective wheel; ii) a half tandem fender, or single radius fender, in which a panel includes a first portion curved from the front to a top of the wheel over part of the radius of the wheel and a second portion extending linearly rearward from the first portion over at least one axle; and iii) a full tandem fender, or dual axle double radius fender, having a first portion curved up and rearward about a first wheel, a second portion extending horizontally rearward over both axles, and a third portion curved downward and rearward about a second wheel.

The different fender types, particularly full tandem fenders, are desirably available in numerous different lengths to accommodate different axle spacings if spanning over dual axle rear wheels. To minimize the number or parts to be manufactured and supplied, various manufacturers have attempted to manufacture half tandem fenders which can be abutted in pairs to form full tandem fenders. Furthermore, linear extension pieces in some instances are known to be mounted in series between two half tandem fenders to produce a longer full tandem fender using similar parts. The fender sections are typically provided with an integral end flange which is perpendicular to the longitudinal direction of the fender so as to be abutted and fastened to the integral end flange of an adjacent fender section. The flexing of the integral end flanges relative to the main longitudinally extending portions of the respective fender sections however tends to produce a resulting fender assembly which is prone to sagging at the abutted connection between adjacent sections. Furthermore, the fender sections cannot be trimmed to length because the integral end flanges are essential for joining adjacent sections such that numerous fender sections must be manufactured with different lengths, otherwise an even weaker fender assembly will result from the use of more fenders sections in series to accommodate the length adjustment.

SUMMARY OF THE INVENTION

According to one aspect of the invention there is provided a modular fender assembly for a vehicle, the modular fender assembly comprising:

a fender body arranged to be supported on the vehicle so as to extend over at least one wheel of the vehicle, the fender body extending between a first end of the fender body and a second end of the fender body, the fender body including:
  a first body portion extending between an outer end at the first end of the fender body and an opposing inner end at an intermediate location along the fender body between the first and second ends of the fender body; and
  a second body portion extending between an outer end at the second end of the fender body and an opposing inner end in abutment with the inner end of the first body portion;
  each of the first and second body portions of the fender body having an upper surface defining a respective portion of the exterior surface of the fender body;
a first joiner bracket on the first body portion of the fender body which includes at least one first joiner flange; and
a second joiner bracket on the second body portion of the fender body which includes at least one second joiner flange which is joined in parallel abutment to said at least one first joiner flange;
wherein the first joiner bracket is joined to the first body portion of the fender body by a bonded connection.

By providing at least one joiner bracket with suitable configuration for bonding connection to the respective fender section, or fender body portion, a single configuration of fender section can be manufactured and trimmed to length to suit the application prior to bonding the joiner bracket in position according to the new trimmed length. Furthermore, the joiner brackets can be arranged to have multiple overlapping and interlocking flanges which span across the abutted seam between two adjacent fender sections, or fender body portions, including upright stiffener flanges for improving strength to reduce bending and sagging of the fender assembly at the seams between adjacent sections.

Preferably each of the first joiner bracket and the second joiner bracket are joined to the respective body portion of the fender body by a bonded connection.

Preferably a lower surface of the first body portion is uniform in profile at least from the inner end thereof to an intermediate position spaced from the inner end towards the outer end, and wherein the first bracket member has a mating portion having a profile arranged to mate in bonded connection with the said profile of the lower surface of the first body portion at a plurality of longitudinally spaced positions therealong. In this instance the inner end of first body portion may comprise a cut end. The second body portion may be similarly arranged to allow for cutting of the inner end of the second body portion.

Preferably each of the first and second joiner brackets comprises a plurality of upright stiffener flanges spanning across the abutted inner ends of the first and second body portions.

The first and second joiner brackets having mating profiles arranged to interlock with one another for longitudinal sliding movement relative to one another.

The first joiner flange and the second joiner flange are preferably parallel to and spaced below a lower surface of the first and second body portions adjacent the inner ends thereof.

A first liner panel may be joined to a lower surface of the first body portion and a second liner panel may be joined to a lower surface of the second body portion. In this instance, each liner panel preferably has an inner end portion which is parallel to the lower surface of the respective body portion and which is joined to the respective joiner bracket in an overlapping configuration. More particularly, the inner end portion of each liner panel may be stepped in relation to a main portion of the liner panel so as to be spaced below the lower surface of the respective body portion of the fender body so as to receive a portion of the respective joiner bracket between the inner end portion of the liner panel and the lower surface of the respective body portion.

Each liner panel may further comprise a plurality of channels integrally formed therein so as to extend longitudinally with the fender body for channelling water towards a rear end of the fender assembly.

When used with a fender mounting arm which extends laterally outwardly from a frame of the vehicle, the fender mounting arm may be connected to the first and second joiner brackets at a location spaced below a portion of the lower surface of the fender body proximate the inner end of the body portions.

According to a second aspect of the present invention there is provided a method of forming a fender assembly for a vehicle, the method comprising:

providing a first fender body portion extending between an inner end and an outer end of the first fender body portion;

providing a second fender body portion extending between an inner end and an outer end of the second fender body portion;

cutting the first fender body portion proximate the inner end such that an overall length of first fender body portion between the inner end and the outer end of the first fender body portion is reduced;

joining a first joiner bracket on the first fender body portion by bonding the first joiner bracket to the first fender body portion adjacent to the inner end of the first fender body portion subsequent to cutting;

providing a second joiner bracket on the second body portion which includes at least one second joiner flange; and joining said at least one first joiner flange to said at least one second joiner flange such that the inner ends of the first and second fender body portions are in abutment and the outer ends of the first and second fender body portions define opposing first and second ends of the fender assembly.

Preferably the method also includes joining the second joiner bracket to the second fender body portion by bonding the second joiner bracket to the second fender body portion adjacent to the inner end of the second fender body portion. The second fender body portion may also be cut to length proximate the inner end such that an overall length of second fender body portion between the inner end and the outer end of the second fender body portion is reduced prior to bonding the second joiner bracket to the second fender body portion.

Preferably the first and second joiner brackets are shaped to allow interlocking of the first joiner bracket and the second joiner bracket in a manner which allows for longitudinal sliding movement of the brackets relative to one another as the inner ends of the first and second fender body portions are abutted with one another prior to joining said at least one first joiner flange to said at least one second joiner flange.

One embodiment of the invention will now be described in conjunction with the accompanying drawings in which:

BRIEF DESCRIPTION OF THE DRAWINGS

FIG. 8 is a perspective view of the first and second joiner brackets prior to assembly.

In the drawings like characters of reference indicate corresponding parts in the different figures.

DETAILED DESCRIPTION

Figure 1:
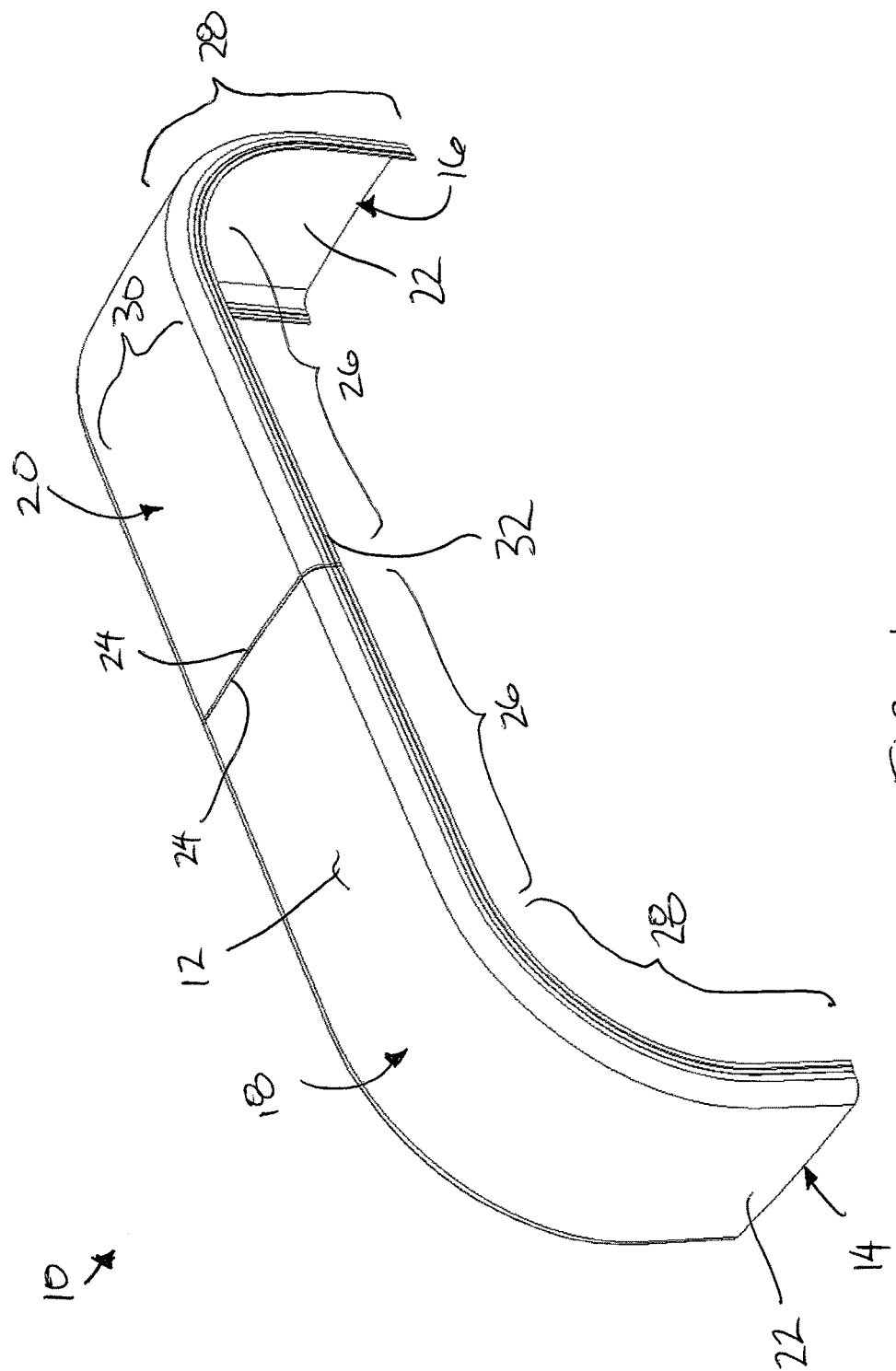
FIG. 1 is a perspective view of a top side of the assembled modular fender assembly.
Figure 2:
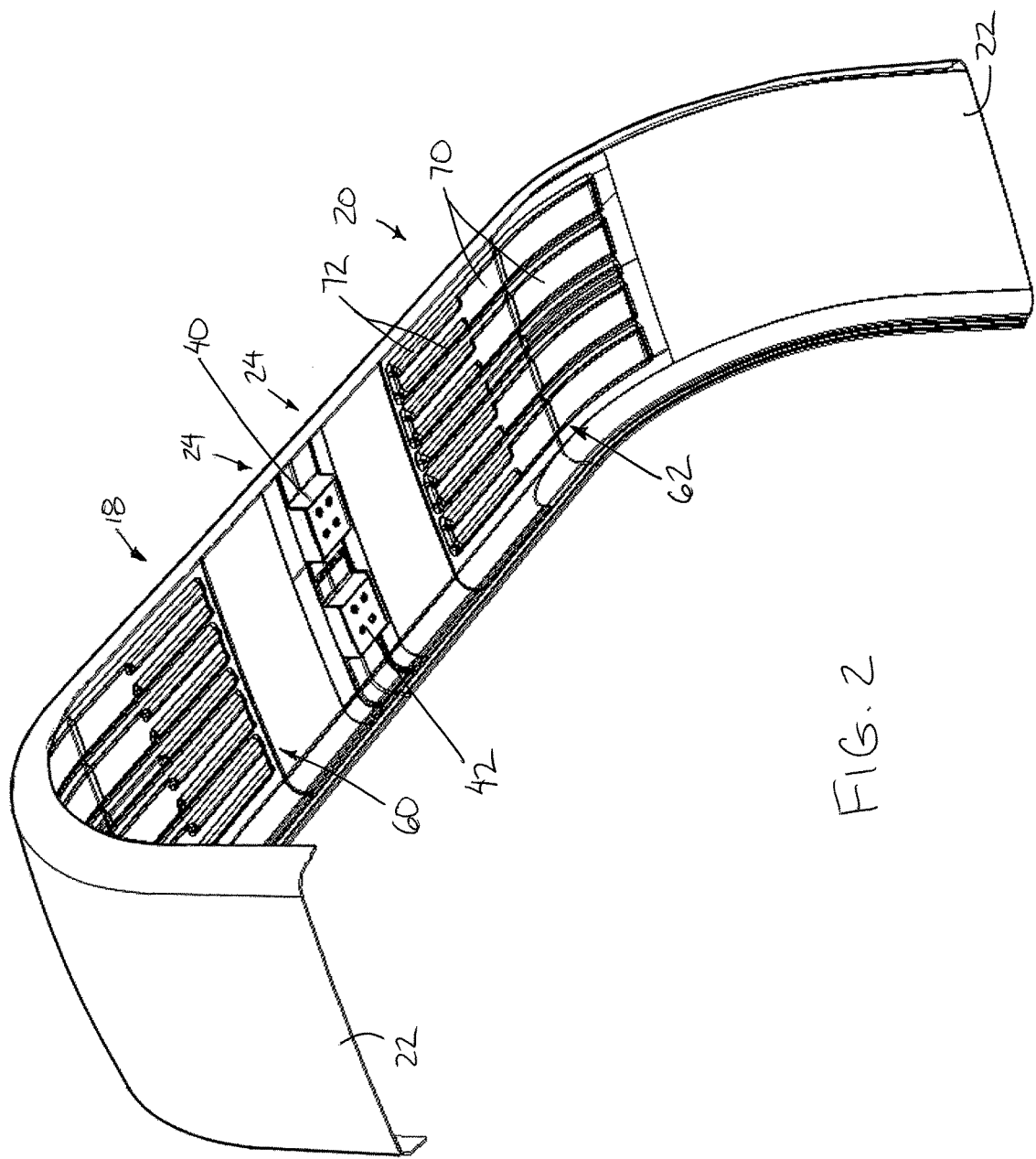
FIG. 2 is a perspective view of a bottom side of the assembled modular fender assembly.
Figure 3:
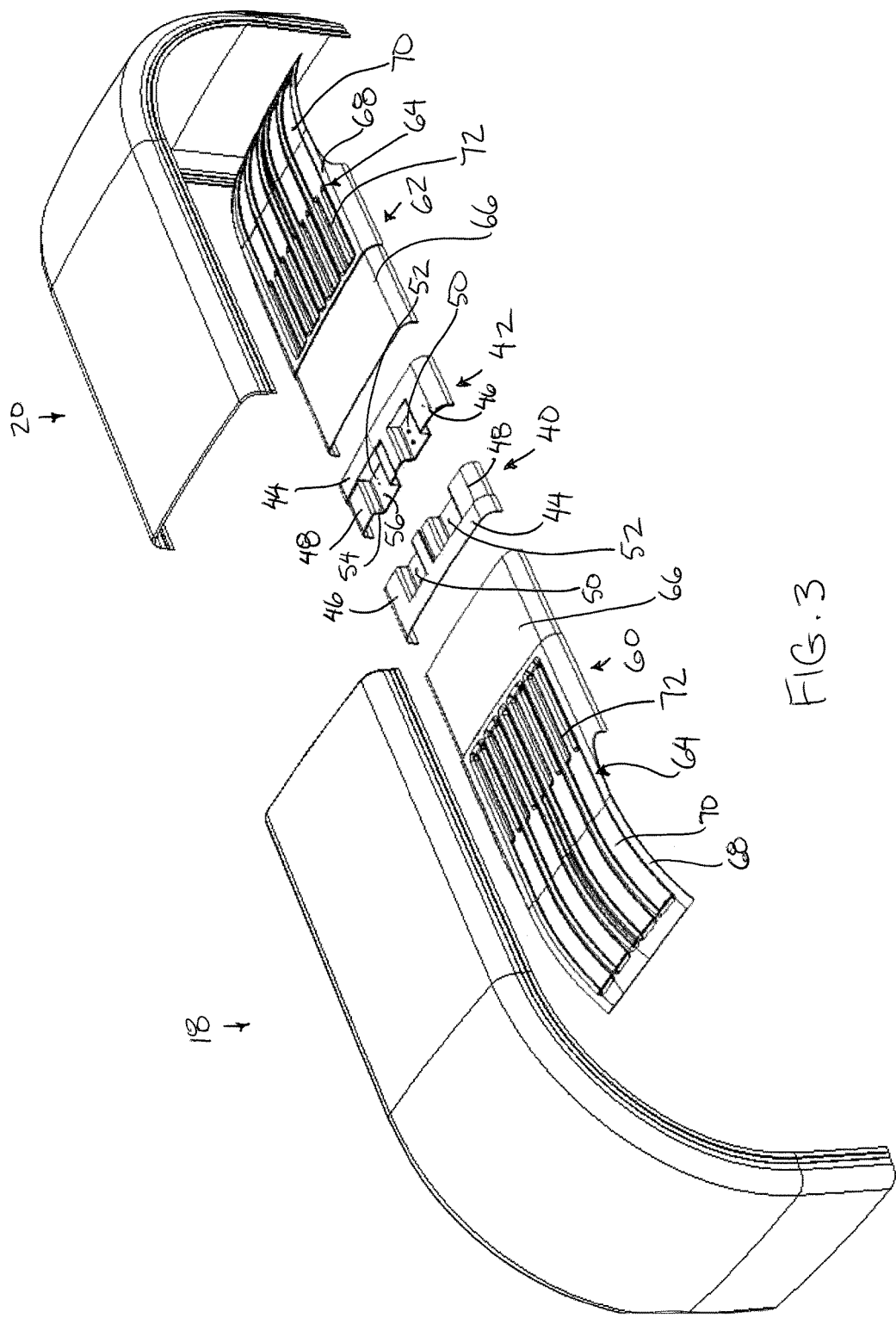
FIG. 3 is an exploded perspective view of the modular fender assembly.
Figure 4:
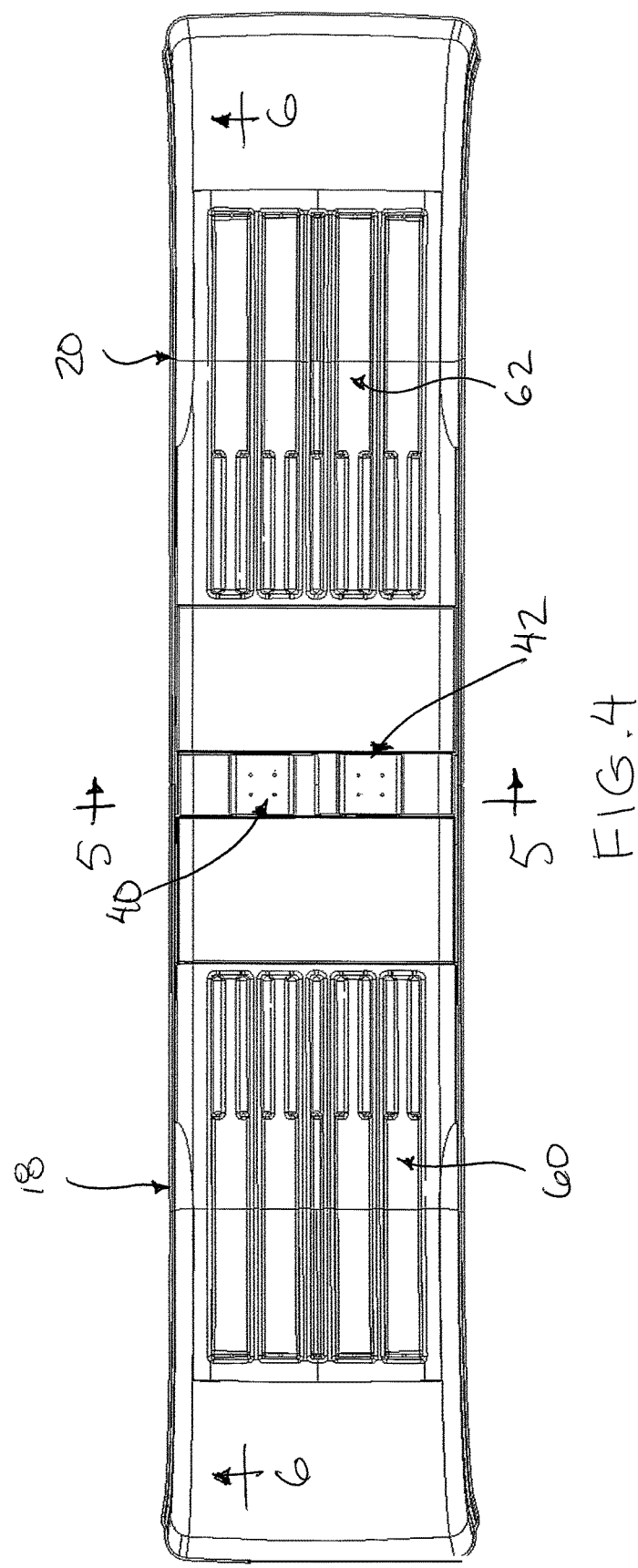
FIG. 4 is a bottom plan view of the modular fender assembly.
Figure 5:
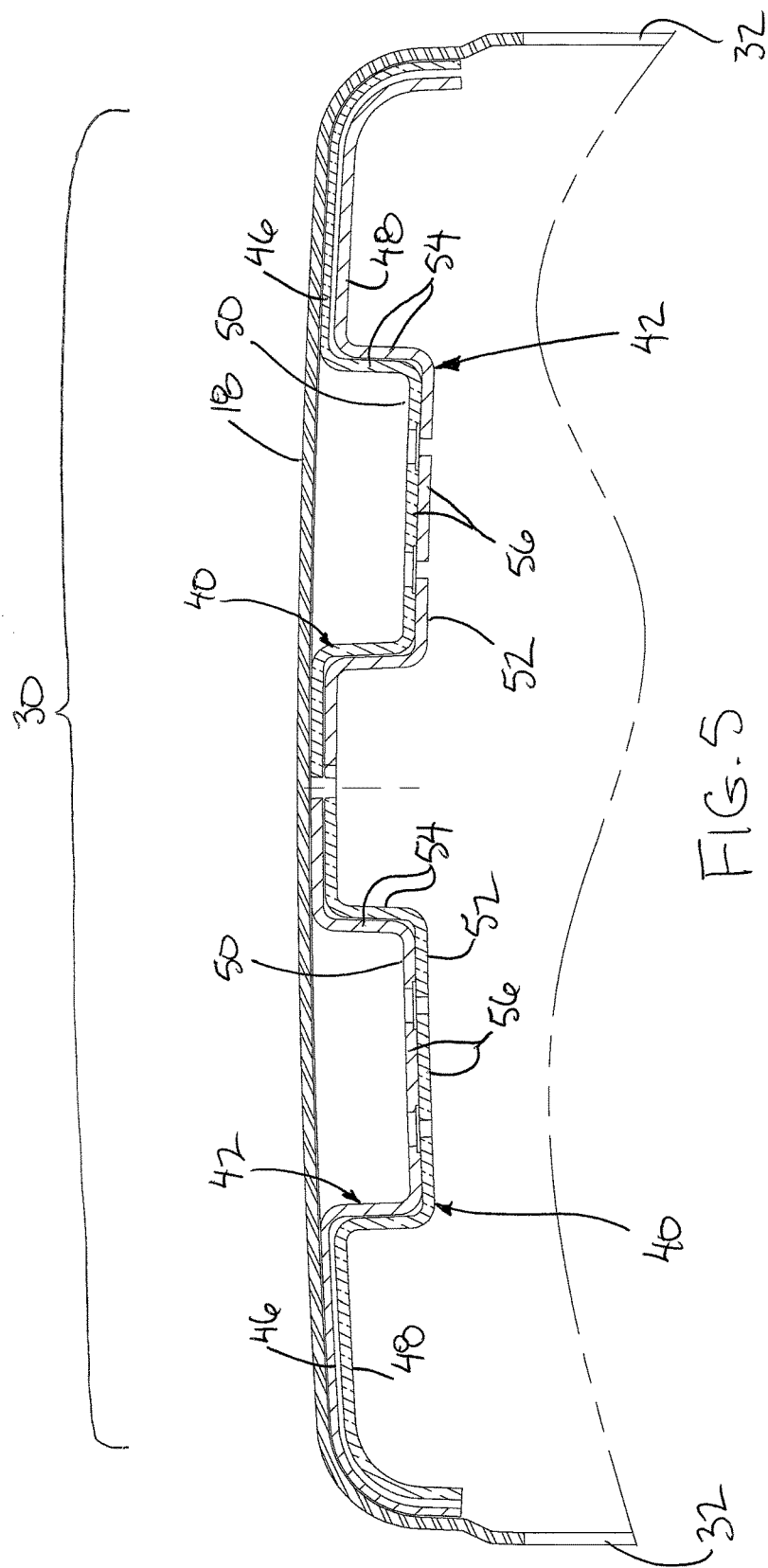
FIG. 5 is a sectional view along the line 5-5 of FIG. 4.
Figure 6:
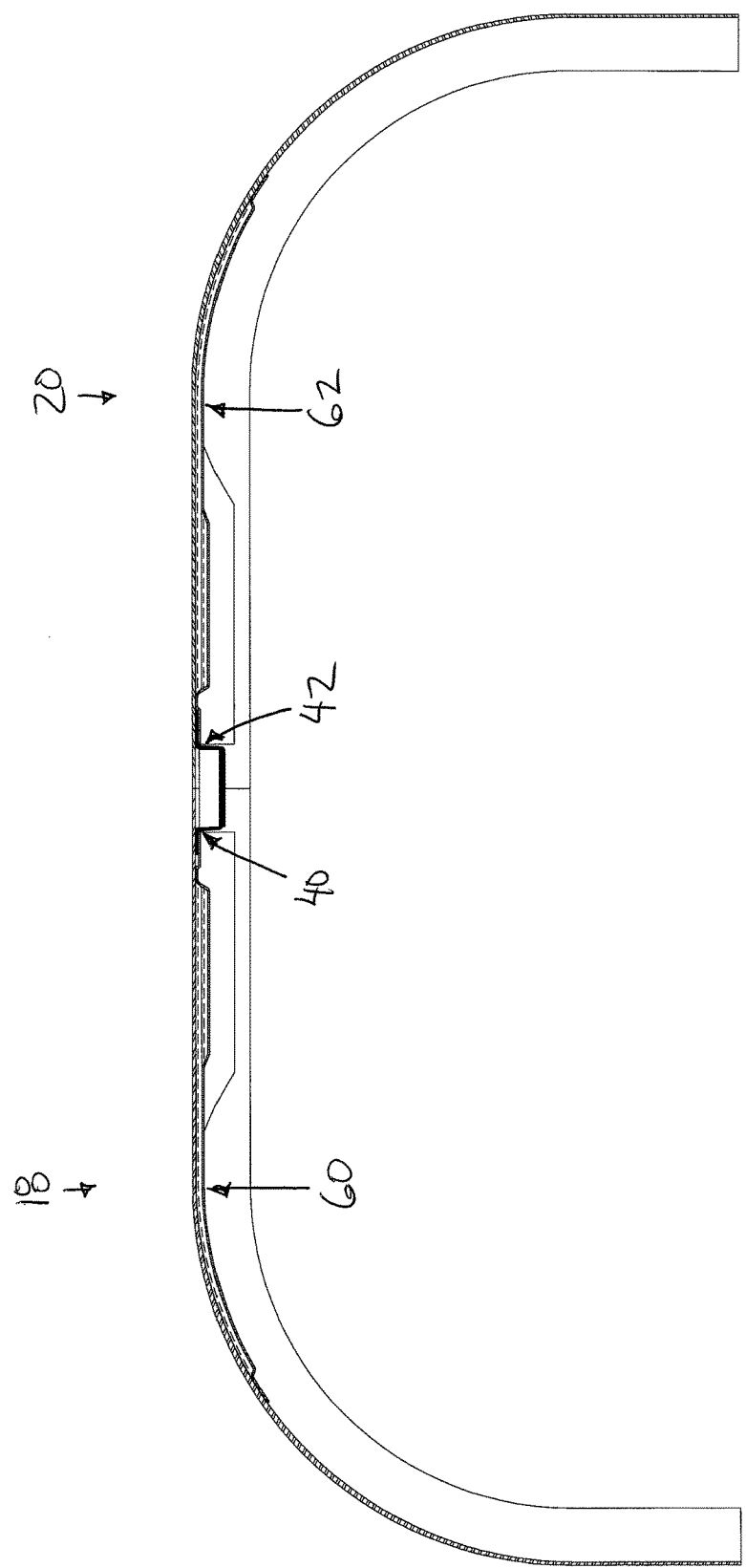
FIG. 6 is a sectional view along the line 6-6 of FIG. 5.
Figure 7:
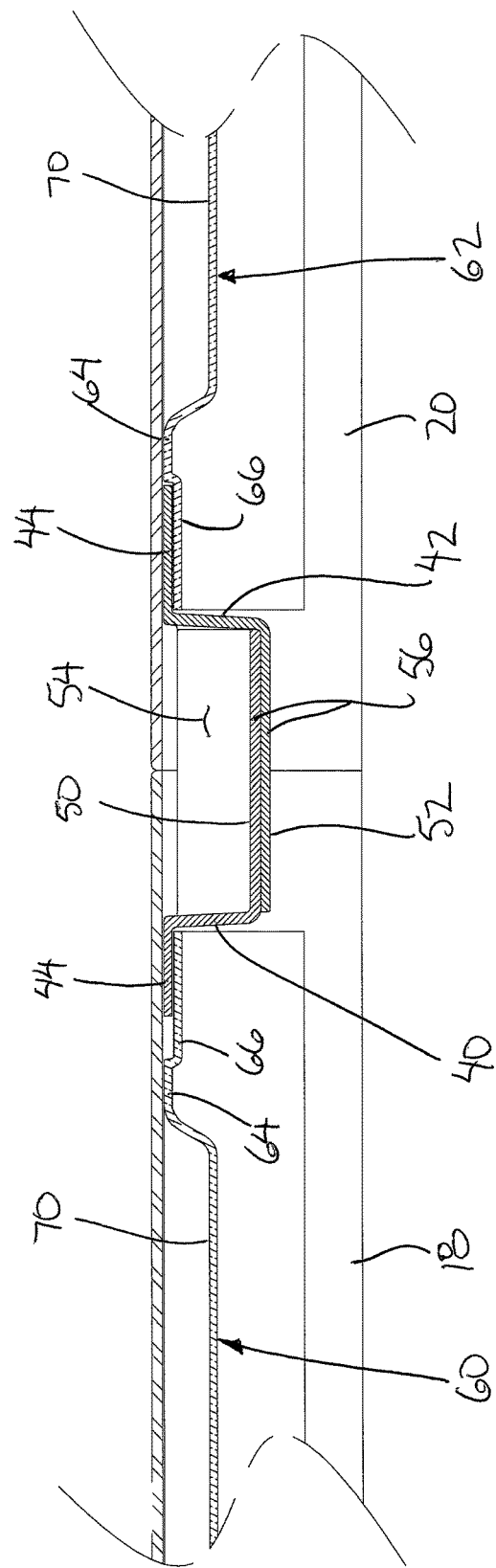
FIG. 7 is an enlarged view of a central portion of FIG. 6.

Referring to the accompanying figures, there is illustrated a modular fender assembly generally indicated by reference numeral 10. The assembly 10 is particularly suited for use with a highway truck tractor. The fender assembly is typically mounted to extend at least partway over top of one or more rear wheels of the truck which are otherwise exposed such that the fender assembly is supported substantially externally of the frame and body of the truck.

In the illustrated embodiment, the fender assembly once assembled spans over two rear wheels which are spaced apart in the longitudinal direction of the truck. Accordingly the assembled fender assembly defines a main fender body 12 spanning the full length over top of the wheels in the longitudinal direction between a first end 14 of the fender body at the front end of the fender assembly and a second end 16 of the main fender body at the rear end of the fender assembly. The overall main fender body 12 is assembled from two sections comprising a first fender body portion 18 at the forward end, and a second fender body portion 20 at the rear end such that the two fender body portions are abutted in series with one another.

The fender body portions are substantially identical with one another such that each extends longitudinally inward from an outer end 22 at the respective front or rear end of the fender assembly to an inner end 24 at a central location between the front and rear ends of the assembled fender assembly such that the two inner ends 24 abut one another at an intermediate location.

Each fender body portion includes an inner end portion 26 which is generally linear and forms the uppermost or top side of the fender assembly. The inner portion of each fender body portion spans horizontally from the abutted inner ends 24 outwardly towards a respective outer end portion 28 at the respective outer end 22. The inner portion has a continuous profile which is uniform along the length thereof from the inner end 24 to the junction with the respective outer end portion 28 at a central location above the respective wheel.

The outer end portion 28 of each fender body portion in the illustrated embodiment forms a 90 degree radius of curvature from a junction with the inner end portion 26 at the top side to a bottom free edge forming the outer end 22 of the fender body portion where the sheeted material forming the fender body portion is substantially vertical in orientation at a location which is spaced longitudinally outward from the respective wheel.

Each fender body portion generally comprises a sheet member having a thickness which various only slightly and having a generally constant profile in the longitudinal direction from the inner end to the outer end thereof. More particularly, the cross section of each fender body portion includes a central portion 30 spanning most of the width of the fender body portion in the lateral direction. The central portion 30 is near flat, but is in actuality uniformly crowned between two opposing side edges locating longitudinally extending depending lips 32 respectively thereon, so as to prevent sagging or shrinkage deformation known as "oil canning". Each lip comprises a portion of the sheet material of the central portion which is curved outwardly and downwardly to a bottom free edge. Accordingly, the cross section perpendicular to the longitudinal direction of each fender body portion is generally in the shape of an inverted U which is open at both longitudinally opposing ends. In this manner, the inner end portion can be trimmed to length at any position therealong without changing the configuration of the resulting new trimmed inner end of the fender body portion.

Each fender body portion is formed of a rigid material, for example a molded thermoplastic, or metal, or various thermosetting composite materials. The outer surface of the fender body portions define respective portions of the exterior or upper surface of the assembled fender body. Likewise an inner surface of the U-shaped cross section defines a respective portion of the interior or lower surface of the fender body.

In order to join the fender body sections with one another, the first fender body portion 18 is provided with a first joiner bracket 40 and the second fender body portion 20 is provided with a second joiner bracket 42. The joiner brackets are identical to one another. Each of the joiner brackets includes a mounting portion which mates in abutment with the inner surface of the respective fender body portion at a location proximate the inner end thereof to permit a bonded connection between the mating surfaces. In this manner, the fender body portions can be trimmed to length at the respective inner ends thereof prior to connection of the joiner brackets, and the joiner brackets can be subsequently bonded in place relative to the new trimmed inner end so as to be properly oriented for interlocking connection with the other joiner bracket when abutting the two fender body portions together in the assembled configuration.

More particularly, each joiner bracket, 40 and 42, includes a mounting flange 44 which directly abuts the inner surface of the fender body portion at a location spaced longitudinally from the inner end thereof. The mounting flanges are each shaped to follow the generally U-shaped cross sectional profile of the fender body portion so as to span laterally the full width of the inner surface including the central portion 30 and the two depending lips 32. The length of each mounting flange 44 in the longitudinal direction of the fender assembly is approximately equal to the spacing of the mounting flange from the inner end of the respective body portion so as to provide an adequate surface area for bonding connection between the mounting flange and the inner surface of the respective fender body portions.

Each of the joiner brackets 40 and 42 further includes a first connector flange 46 and a second connector flange 48 mounted laterally side by side at the inner end of the respective mounting flange 44 so that the combined first and second connecting flanges together span the full width of the fender body assembly. The connector flanges have a length in the longitudinal direction of the fender assembly which are approximately twice the length of the mounting flanges, or more particularly span twice the length of the longitudinal gap between the inner end of the mounting flange and the inner end of the fender body portion. Accordingly, the connecting flanges all span across the abutted seam between the inner ends of the two fender body portions so as to be generally centered in the longitudinal direction relative to the seam. Furthermore, each first connecting flange 46 of the joiner brackets is in direct overlapping arrangement with the second connecting flange 48 of the other joiner bracket along the full length thereof in the longitudinal direction and across the full width thereof and in the lateral direction.

Each first connecting flange 46 is generally flush with the respective mounting flange 44 at the outer side thereof for being in direct engagement with the inner surface of the respective body portion along part of the length thereof and for being in direct engagement with the inner surface of the other fender body portion along the remainder of the width thereof, while spanning the full length between the two mounting flanges 44.

Each second connecting flange 48 is stepped relative to the respective mounting flange 44 so as to be spaced from the inner surface of the respective fender body portion by a uniform spacing corresponding to the thickness of the first connecting flange across the full width and length thereof. Each second connecting flange 48 is thus arranged for overlapping the outer bottom side of the first connecting flange 46 of the other joiner bracket along the full length thereof in the longitudinal direction and across the full width thereof and in the lateral direction. The connector flanges 46 and 48 thus provide two overlapping layers of material spanning across the seam between the abutted inner ends of the two fender body portions across the full width of the fender assembly in the lateral direction between the longitudinal side edges thereof.

Each connecting flange 46 and 48 also includes a channel portion formed integrally therein such that the first and second joiner brackets interlock with one another to restrict relative movement therebetween to a longitudinal sliding movement as the inner ends of the two fender body portions are brought together into abutment during assembly. More particularly, each first connecting flange 46 of each joiner bracket locates a first channel 50 therein and each second connecting flange 48 of each joiner bracket locates a second channel 52 formed therein.

All of the channels 50 and 52 are generally U-shaped so as to comprise two upright stiffener flanges 54 which are laterally spaced apart and extend in the longitudinal direction across the seam between the abutted ends, and a joiner flange 56 which is generally planar and horizontal for connecting between the two upright stiffener flanges 54. The stiffener flanges 54 thus extend longitudinally across the abutted seam, transversely to the central portion of the inner surface of the fender body portions such that the upright stiffener flange overlaps a portion of each of the first and second body portions in the longitudinal direction that the fender body extends. The joiner flanges 56 thus extend longitudinally across the abutted seam, parallel to the central portion of the inner surfaces of the fender body portions. As illustrated in the accompanying figures and described in the following, the joiner flanges are joined to one another using connecting fasteners such that the upper surfaces of the first and second fender body portion are flush with one another and are uninterrupted by the connecting fasteners.

Each first channel 50 is provided with stiffener flanges 54 which are slightly shorter in height and narrower in lateral spacing therebetween as compared to the stiffener flanges of a corresponding second channel 52 arranged for mating connection therewith. The difference in height and lateral spacing corresponds approximately to the thickness of the sheeted material forming the channels. In this manner, each first channel of a first connecting flange 46 mates for longitudinal sliding within the interior of the second channel 52 of the second connecting flange of the other joiner bracket in an assembled and mated connection therebetween.

The joiner flanges 56, the connector flanges 46 and 48, and the stiffener flanges 54 are all arranged to be generally centered in the longitudinal direction relative to the abutted seam of the fender body portions to span longitudinally across the seam for stiffening the abutted connection. Furthermore, the noted flanges all span the full dimension in the longitudinal direction between the two mounting flanges 44 bonded to the first and second fender body portions respectively at positions proximate to but spaced from the inner ends 24 thereof.

The upright stiffener flanges 54 depend downwardly from the respective connecting flanges to locate the joiner flanges 56 at a location parallel and spaced below the bottom inner surface of the fender body portions. The joiner flanges lie directly against one another along the full length and width thereof to permit a fastened connection therebetween to retain the fender body portions in the assembled configuration with the inner ends of the fender body portions abutted with one another. The two joiner flanges 56 of the first joiner bracket on the first fender body portion are generally referred to herein as first joiner flanges, while the two joiner flanges 56 of the second joiner bracket 42 supported on the second fender body portion 20 are generally referred to herein as second joiner flanges.

To enable the fastened connection between the joiner flanges of the first joiner bracket to the joiner flanges of the second joiner bracket, suitable anchors, such as a threaded nut, may be embedded into the innermost one of the flanges at each overlapping pair of flanges so that a threaded bolt may be inserted from the bottom exterior side of the overlapping flanges.

The first fender body portion 18 is further provided with a first liner panel 60. Similarly, the second fender body portion 20 is further provided with a second liner panel 62. Each liner panel, 60 and 62, includes a main portion 64 along the majority of the length of the liner panel up to an outer end of the liner panel. The main portion is bonded to the inner surface of the respective fender body portion. Each liner panel is further provided with an inner end portion 66 extending from an inner end of the main portion 64 to a corresponding inner end of the liner panel. The inner end portion 66 forms an overlapping connection with the mounting flange 44 of a respective one of the joiner brackets, 40 or 42, as described in further detail below.

The main portion 64 of each liner panel includes a perimeter portion 68 which forms the bonded connection to the inner surface of the respective fender body portion. A plurality of integral channels 70 are formed in the main portion where a portion of the sheeted material forming the liner panel is formed in protruding relation to the perimeter portion so that the material at each integral channel 70 is maintained in a spaced relation with the inner surface of the fender body portion. The channels are elongate in the longitudinal direction such that each channel spans substantially the full length of the main portion in the longitudinal direction. A plurality of the channels 70 are formed side by side in the lateral direction such that a longitudinal strip of material between each adjacent pair of channels is also located in direct abutment with the inner surface of the fender body portion to permit a bonded connection therebetween as well. In this manner, each channel 70 is bonded about the full perimeter thereof relative to the inner surface to prevent access of any road debris between the liner panel and the inner surface of the fender body portion.

Each channel 70 further includes a plurality of raised ribs forming auxiliary channels 72. At each auxiliary channel 72, the sheeted material forming the liner panel protrudes yet further from the inner surface of the fender body portion relative to the main channels 70. The ribs forming the auxiliary channels 72 are narrower in width so as to locate plural ribs relative to each main channel 70. The elongate ribs also are oriented to be elongate in the longitudinal direction and provide further assistance in guiding or channelling water towards the outer ends of the fender body portions.

The inner end portion 66 of each liner panel comprises a generally flat sheet for spanning the main portion of the inner surface of the fender body portion between the two side edges thereof along with depending portions conforming to the shape of the depending lips at the side edges of the fender body portions. Each inner end portion is stepped in relation to the perimeter portion 68 of the main portion 64 of the liner panel so as to be maintained in spaced relation from the inner surface of the respective fender body portion by a thickness corresponding to a thickness of the mounting flanges 44 of the respective joiner brackets. The inner end portions are thus arranged for overlapping the exterior bottoms sides of the mounting flanges 44 of the joiner brackets to form a bonded connection therebetween in the assembled configuration of each fender body portion.

The uniform cross section of the inner end portions 66 of the liner panels along the length thereof permits the inner end portions of the liner panels to be trimmed to length together with the inner ends of the fender body portions while maintaining a prescribed space or longitudinal distance between the inner end of the liner panel and the inner end of the respective fender body portion. The prescribed longitudinal distance between the inner end of each liner panel and the inner end of the respective fender body portion corresponds approximately to half the longitudinal length of the joiner flanges and connecting flanges such that each liner panel is arranged to overlap across the full length of the respective mounting flange 44 in the longitudinal direction so as to be abutted at the inner end of each liner panel with the step in the respective joiner bracket between the mounting flange and the connecting flange thereof.

The first and second liner panels are identical to one another. More particularly, both liner panels each have a suitable length such that the main portion 64 thereof has a length which is greater than the linear inner portion 26 of the first fender body portion and the outer end of the main portion 64 is curved to follow the longitudinal curvature of a portion of the curved outer portion 28 of the fender body portion.

In use, a manufacturer only requires a single mold to produce a single fender body portion which in turn can be used for both the first and second fender body portions in the illustrated embodiment. Similarly, a single mold can be used to produce both joiner brackets, and a further single mold can be used to produce both liner panels.

One or both of the fender body portions can be trimmed to length at the inner ends thereof such that when the inner ends of two fender body portions are abutted, the overall length of the fender assembly corresponds to the desired length of the fender assembly for a particular pair of longitudinally spaced rear wheels of a highway truck/tractor.

Once the length of the fender body portions has been selected, the first and second joiner brackets can be bonded to the inner surface with the mounting flanges spaced from the inner ends by the prescribed distance corresponding to half the longitudinal length of the connecting flanges and the joiner flanges.

The first and second liner panels are also trimmed at the inner ends thereof such that the liner panels can be mated and bonded to the inner surface of the fender body portions with the inner ends having a suitable length for overlapping the mounting flanges of the respective joiner brackets. The liner panels are then bonded to the inner surface about the perimeter of each channel and about the perimeter of the overall liner panel in addition to the bonded connection at the overlapping arrangement of the inner end portion of each liner panel with the respective mounting flange. The bonded overlapping connection of the liner panels to the mounting flanges of the joiner brackets further stiffen the joiner brackets relative to the fender body portions.

The two fender body portions can then be joined to one another by interlocking the first and second joiner brackets for mating longitudinal relative sliding therebetween to enable the inner ends of the two fender body portions to be slid together and abutted with one another. Fastening of the joiner flanges of the first joiner bracket 40 to the joiner flanges of the second joiner bracket 42 completes the assembly process to provide a stiff connection between the fender body portions while allowing some length adjustment therebetween.

To attach the assembled fender assembly to the frame of the truck, a central fender mounting arm is typically provided which is mounted in fixed connection to the frame of the truck at one end to protrude laterally outwardly at a central location between the two rear wheels near the top side thereof at the outer end of the mounting arm. The outer end of the fender mounting arm can be suitably arranged for making a fastened connection to the joiner flanges of the first and second joiner brackets at a location spaced downwardly from the inner surface of the fender body to allow access for the fasteners while remaining unseen at the top or exterior surface of the fender body.

In some instances, a single centrally located fender mounting arm as noted above may be sufficient to support the entirety of the fender assembly over the rear wheels if the fender assembly is stiff enough; however, typically mounting arms are provided at the inner or outer surface of the fender body portion towards the front and rear ends of the assembled fender body, either instead of a central mounting arm or in addition to a central mounting arm.

The mounting arms at the outer ends of the fender assembly could be fixed at an inner end to the frame of the highway truck/tractor to extend laterally outwardly in proximity to the wheel for connection to metal or plastic brackets bonded to the inner surface of the main fender body towards the outer ends thereof.

Alternatively the fender mounting arms at the outer ends of the fender assembly can be mounted in a fixed connection to the frame of the truck at one end to protrude laterally outwardly at a location approximately centered on the outer surface of the curved portion 28 of the first fender body 18. The outer end of the fender mounting arm can be suitably arranged for making a fastened connection through the fender body by means of a bolt and nut. This same arrangement can be repeated for attachment of a second fender mounting arm across the outer, curved portion 28 of the second fender body 20.

Since various modifications can be made in my invention as herein above described, it is intended that all matter contained in the accompanying specification shall be interpreted as illustrative only and not in a limiting sense.

The invention claimed is:

1. A modular fender assembly for a vehicle, the modular fender assembly comprising:
    a fender body arranged to be supported on the vehicle so as to extend over at least one wheel of the vehicle, the fender body extending in a longitudinal direction between a first end of the fender body and a second end of the fender body, the fender body including:
        a first body portion extending between an outer end at the first end of the fender body and an opposing inner end at an intermediate location along the fender body between the first and second ends of the fender body; and
        a second body portion extending between an outer end at the second end of the fender body and an opposing inner end in abutment with the inner end of the first body portion;
        each of the first and second body portions of the fender body having an upper surface defining a respective portion of the exterior surface of the fender body;
    a first joiner bracket on the first body portion of the fender body which includes at least one first joiner flange; and
    a second joiner bracket on the second body portion of the fender body which includes at least one second joiner flange which is joined in parallel abutment to said at least one first joiner flange;
    wherein the first joiner bracket is joined to the first body portion of the fender body by a bonded connection; and
    wherein at least one of the first and second joiner brackets comprises an upright stiffener flange spanning in said longitudinal direction transversely across the abutted inner ends of the first and second body portions such that the upright stiffener flange overlaps a portion of each of the first and second body portions in said longitudinal direction.

2. The assembly according to claim 1 wherein each of the first joiner bracket and the second joiner bracket are joined to the respective body portion of the fender body by a bonded connection.

3. The assembly according to claim 1 wherein a lower surface of the first body portion is uniform in profile at least from the inner end thereof to an intermediate position spaced from the inner end towards the outer end, and wherein the first bracket member has a mating portion having a profile arranged to mate in bonded connection with the said profile of the lower surface of the first body portion at a plurality of longitudinally spaced positions therealong.

4. The assembly according to claim 3 wherein the inner end of the first body portion comprises a cut end.

5. The assembly according to claim 1 wherein each of the first and second joiner brackets comprises a plurality of upright stiffener flanges spanning across the abutted inner ends of the first and second body portions.

6. The assembly according to claim 1 wherein the first and second joiner brackets have mating profiles arranged to interlock with one another for longitudinal sliding movement relative to one another.

7. The assembly according to claim 1 wherein said at least one first joiner flange and said at least one second joiner flange are parallel to and spaced below a lower surface of the first and second body portions adjacent the inner ends thereof.

8. The assembly according to claim 1 further comprising a first liner panel joined to a lower surface of the first body portion and a second liner panel joined to a lower surface of the second body portion, each liner panel having an inner end portion which is parallel to the lower surface of the respective body portion and which is joined to the respective joiner bracket in an overlapping configuration.

9. The assembly according to claim 1 in combination with a central fender mounting arm for extending laterally outwardly from the vehicle, wherein the central fender mounting arm is connected to the first and second joiner brackets at a location spaced below a portion of the lower surface of the fender body proximate the inner end of the body portions.

10. The assembly according to claim 1 wherein the first and second joiner brackets are identical to one another.

11. A method of forming a fender assembly for a vehicle, the method comprising:
providing a first fender body portion extending between an inner end and an outer end of the first fender body portion and having an upper surface defining a respective portion of an exterior surface of the fender assembly;
providing a second fender body portion extending between an inner end and an outer end of the second fender body portion and having an upper surface defining a respective portion of an exterior surface of the fender assembly;
cutting the first fender body portion proximate the inner end such that an overall length of first fender body portion between the inner end and the outer end of the first fender body portion is reduced;
joining a first joiner bracket on the first fender body portion by bonding the first joiner bracket to the first fender body portion adjacent to the inner end of the first fender body portion subsequent to cutting such that the first joiner bracket and the first fender body portion are joined solely by the bonded connection therebetween;
providing a second joiner bracket on the second body portion which includes at least one second joiner flange; and
joining said at least one first joiner flange to said at least one second joiner flange using connecting fasteners such that (i) the inner ends of the first and second fender body portions are in abutment and the outer ends of the first and second fender body portions define opposing first and second ends of the fender assembly and (ii) the upper surfaces of the first and second fender body portion are flush with one another and are uninterrupted by said connecting fasteners.

12. The method according to claim 11 including joining the second joiner bracket to the second fender body portion by bonding the second joiner bracket to the second fender body portion adjacent to the inner end of the second fender body portion.

13. The method according to claim 12 including cutting the second fender body portion proximate the inner end such that an overall length of second fender body portion between the inner end and the outer end of the second fender body portion is reduced prior to bonding the second joiner bracket to the second fender body portion.

14. The method according to claim 11 including interlocking the first joiner bracket and the second joiner bracket for longitudinal sliding movement relative to one another as the inner ends of the first and second fender body portions are abutted with one another prior to joining said at least one first joiner flange to said at least one second joiner flange.

15. A modular fender assembly for a vehicle, the modular fender assembly comprising:
a fender body arranged to be supported on the vehicle so as to extend over at least one wheel of the vehicle, the fender body extending in a longitudinal direction between a first end of the fender body and a second end of the fender body, the fender body including:
a first body portion extending between an outer end at the first end of the fender body and an opposing inner end at an intermediate location along the fender body between the first and second ends of the fender body; and
a second body portion extending between an outer end at the second end of the fender body and an opposing inner end in abutment with the inner end of the first body portion;
each of the first and second body portions of the fender body having an upper surface defining a respective portion of the exterior surface of the fender body;
a first joiner bracket on the first body portion of the fender body which includes at least one first joiner flange, the first joiner bracket is joined to the first body portion of the fender body by a bonded connection;
a second joiner bracket on the second body portion of the fender body which includes at least one second joiner flange which is joined in parallel abutment to said at least one first joiner flange; and
a first liner panel joined to a lower surface of the first body portion and a second liner panel joined to a lower surface of the second body portion, each liner panel having an inner end portion which is parallel to the lower surface of the respective body portion and which is joined to the respective joiner bracket in an overlapping configuration.

16. The assembly according to claim 15 wherein the inner end portion of each liner panel is stepped in relation to a main portion of the liner panel so as to be spaced below the lower surface of the respective body portion of the fender body so as to receive a portion of the respective joiner bracket between the inner end portion of the liner panel and the lower surface of the respective body portion.

17. The assembly according to claim 15 further comprising each liner panel having a plurality of channels integrally formed therein so as to extend longitudinally with the fender body.

* * * * *